United States Patent [19]

Kasahara et al.

[11] 4,421,892

[45] Dec. 20, 1983

[54] THERMOPLASTIC POLYMERIC MATERIAL AND METHOD FOR THE PREPARATION THEREOF

[75] Inventors: Hideo Kasahara; Kichiya Tazaki, both of Yokohama; Kunio Fukuda, Chigasaki; Hiroshi Suzuki, Tokyo, all of Japan

[73] Assignee: Asahi-Dow Limited, Tokyo, Japan

[21] Appl. No.: 375,685

[22] Filed: May 6, 1982

Related U.S. Application Data

[63] Continuation of Ser. No. 190,737, Sep. 25, 1980, abandoned, which is a continuation-in-part of Ser. No. 355,384, Mar. 8, 1982, abandoned.

[30] Foreign Application Priority Data

| Oct. 4, 1979 [JP] | Japan | 54/127298 |
| Oct. 9, 1979 [JP] | Japan | 54/129467 |
| Nov. 14, 1979 [JP] | Japan | 54/146506 |
| Feb. 8, 1980 [JP] | Japan | 55/13560 |

[51] Int. Cl.$^3$ ............................................. C08G 81/02
[52] U.S. Cl. .................................. 524/514; 524/606; 524/607; 525/183
[58] Field of Search ................ 525/183; 524/514, 606, 524/607

[56] References Cited

U.S. PATENT DOCUMENTS

| Re. 30,322 | 7/1980 | Hammer et al. | 525/183 |
| 2,524,045 | 10/1950 | Flory | 525/183 |
| 3,261,885 | 7/1966 | Craubner et al. | 525/183 |
| 3,539,664 | 11/1970 | Kray et al. | 525/182 |
| 3,644,571 | 2/1972 | Anderson et al. | 525/183 |
| 3,673,277 | 6/1972 | Schmitt et al. | 525/183 |
| 3,966,839 | 6/1976 | Sims | 525/179 |
| 3,972,961 | 8/1976 | Hammer et al. | 525/183 |
| 4,100,223 | 7/1978 | Meyer et al. | 525/179 |

FOREIGN PATENT DOCUMENTS 1440030 6/1976 United Kingdom .

*Primary Examiner*—Wilbert J. Briggs, Sr.
*Attorney, Agent, or Firm*—Armstrong, Nikaido, Marmelstein & Kubovcik

[57] ABSTRACT

A thermoplastic polymeric material which is superior in mechanical strength comprises (1) 10 to 65% by weight of a hard copolymer containing as a comonomer an $\alpha,\beta$-unsaturated dicarboxylic acid anhydride and (2) 90 to 35% by weight of a polyamide, which are chemically bonded to each other. The thermoplastic polymeric material has a fine dispersion microstructure. The material may be reinforced by incorporating glass or carbon fibers therein.

21 Claims, 4 Drawing Figures

THERMOPLASTIC POLYMERIC MATERIAL AND METHOD FOR THE PREPARATION THEREOF

This is a continuation-in-part application of application Ser. No. 355,384 filed on Mar. 8, 1982, abandoned which is a continuation of application Ser. No. 190,737 filed on Sept. 25, 1980 abandoned.

BACKGROUND OF THE INVENTION

1. Field of the Invention

The present invention relates to a thermoplastic polymeric material which predominantly comprises a novel copolymer composed of chain moieties derived from a hard copolymer containing as a comonomer an $\alpha,\beta$-unsaturated dicarboxylic acid anhydride, and polyamide chain moieties, both moieties being chemically bonded to each other, and to a method for the preparation of such thermoplastic polymeric material.

2. Description of the Prior Art

Polystyrene, styrene-acrylonitrile copolymers, acrylonitrile-styrene-butadiene copolymers, polymethyl methacrylate and similar polymeric materials have widely been used as molding materials because of their high dimensional stability and good moldability, while the improvement in their chemicals, thermal and abrasion resisting properties are still desired. On the other hand, polyamides have also been used widely as molding materials because of their superior resistance to chemicals, heat and abrasion. However, polyamides suffer from some disadvantages such as strong shrinkage during molding process which may cause "sink marks" and "warpage" in the molded articles; high hygroscopicity and significant decrease in mechanical strength and large dimensional change after they take up moisture.

It has been proposed that a polyamide is melt blended with polystyrene or a styrene-acrylonitrile copolymer in order to improve the hygroscopicity and other properties of the polyamide (Belgian Patent Nos. 638940 and 638941). However, this technique involves serious disadvantages in that the styrene polymer or copolymer has so poor compatibility with polyamides that the molded articles obtained from such blend show laminar peeling phenomenon and possess inferior mechanical strength. Because of this, such blend is not known as satisfactory molding material. In U.S. Pat. No. 3,966,839 it is disclosed that polystyrene and a polyamide are melt blended with addition of a small amount of a low molecular weight (1000 to 3000 M.W.) styrene-maleic anhydride copolymer which is used in order to improve the compatibility between the polyamide and polystyrene. By the addition of the low molecular weight styrene-maleic anhydride copolymer, an improvement is found in the compatibility between these polymers, but it is still insufficient so that when the blend is used in injection molding into complicated shape the above-mentioned peeling condition may occur, resulting in unfavorable mechanical strength of the molded article.

U.S. Pat. Re. No. 30,322 teaches a polymer obtained by grafting an oligometric polyamide (polymerization degree of 5 to 60) onto an elastomeric trunk polymer. However, when such a polyamide having a low molecular weight is used together with the hard trunk polymer as used in the present invention, the resultant polymer has remarkably low impact resistant strength and rigidity and a low heat distortion temperature so that it cannot provide a polymeric material useful as a thermoplastic molding material.

The reaction of a low molecular weight (ca. 1500 M.W.) styrene-maleic anhydride copolymer with an alkylamine is disclosed in U.S. Pat. Nos. 3,365,399 and 3,444,151. The product of such reaction is a low molecular weight compound and used only as an additive or dispersing agent. There is no prior art which suggests that the above reaction product is used as a molding material. In addition, it is well known that a reaction of a low molecular weight compound is not directly applicable to a homologous high molecular weight compound, because of the low reactivity and the liability to cross-linking reactions of the high molecular weight compound.

In the past many attempts have been proposed which are directed to improving the impact stremgth of polyamides by blending with the polyamide a carboxyl-containing olefin polymer or an olefin-acrylate copolymer. However, in such cases it is believed that the terminal groups of the polyamide and the carboxyl group interact with each other through ionic hydrogen bond rather than cause cross-linking or grafting, as described in British Pat. No. 998,439.

British Pat. No. 1,440,030 describes a blend of a polyamide with a styrene-methacrylate or styrene-acrylate copolymer. However, in this patent any reaction between the polyamide and the styrene copolymer is not noted.

Similarly in our experiments, a combination of a polyamide and a styrene-methacrylic acid or styrene-methyl methacrylate copolymer could not provide a molding material having excellent mechanical strength. Moreover, we found from the results of analytical experiments that the above-mentioned combination did not bring about the formation of a copolymer comprising styrene-methacrylic acid or styrene-methyl methacrylate copolymer chain moieties and polyamide chain moieties bonded to each other.

Accordingly, it is an object of this invention to develop a material having the good performance each of polystyrene and polyamides.

SUMMARY OF THE INVENTION

The present invention provides a thermoplastic polymeric material which predominantly comprises a novel copolymer composed of styrene copolymer or unsaturated carboxylic acid ester copolymer chain moieties having carboxylic acid anhydride radicals therein and polyamide chain moieties, both moieties being bonded to each other (said novel copolymer being hereinafter referred to merely as "novel copolymer"). Thus, in accordance with the invention, there is provided a thermoplastic polymeric material which predominantly comprises a novel copolymer characterized by having polymer chain moieties A composed of a hard random copolymer having a molecular weight of 30,000 to 300,000 including an $\alpha,\beta$-unsaturated dicarboxylic acid anhydride and either a styrene compound or an unsaturated carboxylic acid ester as essential components and polymer chain moieties B composed of a polyamide having a molecular weight of 10,000 to 50,000, said polymer chain moieties A and B being chemically bonded to each other, said polymer chain moieties A being contained in a range of 10 to 65% by weight based on the weight of the said novel copolymer and said polymer chain moieties B being contained in a range of 90 to 35% by weight based on the weight of the said novel copolymer.

The thermoplastic polymeric material provided in accordance with the present invention is a molding material having good mechanical strength, high dimensional stability, good moldability, and good resistance to chemicals, heat and abrasion. Furthermore, the polymeric material of the present invention has no geled state. Namely, according to the present invention, there is no occurrence of geled state between high molecular weight polymers, which is a surprising effect and cannot be expected from prior arts.

BRIEF DESCRIPTION OF THE DRAWING

In the accompanying drawing.

DETAILED DESCRIPTION

In order to allow a better understanding of the novel copolymers of the present invention, they are explained in comparison with a mixture of a styrene-acrylonitrile copolymer and a polyamide (which is hereinafter referred to as "mixture") in the following.

First, when subjected to solvent fractionation (using cresol/methyl ethyl ketone as a solvent system), the mixture is entirely separated into its individual components, i.e., the styrene-acrylonitrile copolymer and the polyamide, whereas the novel copolymer of the present invention cannot be fractionated, which indicates that the styrene copolymer or unsaturated carboxylic acid ester copolymer containing dicarboxylic acid anhydride radicals is chemically bonded to the polyamide. In addition, from facts that when the novel copolymer is dissolved and disintegrated in conc. hydrochloric acid the styrene copolymer or unsaturated carboxylic acid ester copolymer remains and that the novel copolymer shows a peak in the proximity of the melting point of the polyamide in its thermal analysis, it can be seen that the novel copolymer has a particular structure in which the styrene copolymer or unsaturated carboxylic acid ester copolymer chain moieties having dicarboxylic acid anhydride radicals are bound to the polyamide moieties.

Figure 1:
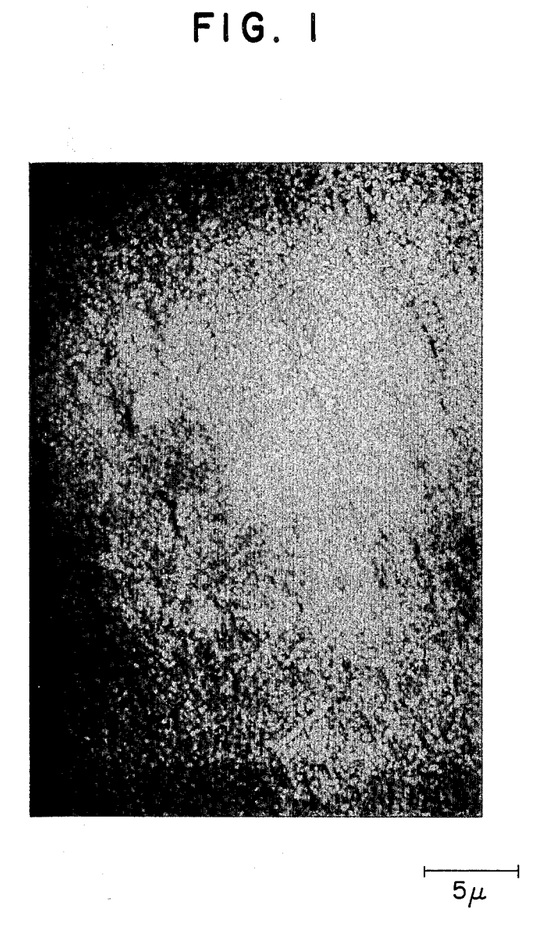
FIG. 1 is an electron micrograph of a novel copolymer composed of styrene-maleic anhydride copolymer chain moieties and polycaprolactam chain moieties which is an example of a preferred embodiment of the present invention.
Figure 2:
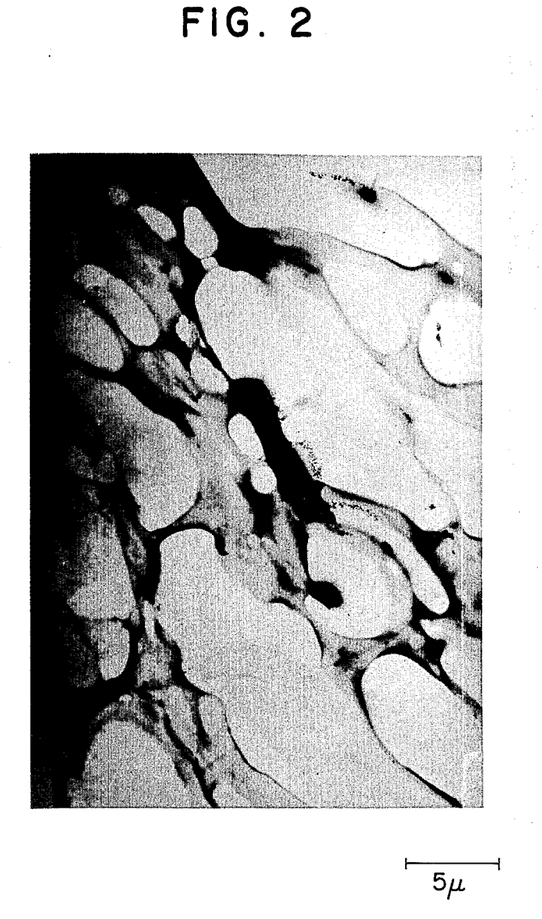
FIG. 2 illustrates an electron micrograph of a mixture of a styrene-acrylonitrile copolymer and polycaprolactam.

Another difference is found in the electron micrographs. For example, in the electron micrograph of the polymeric material of the present invention which predominantly comprises the novel copolymer composed of styrene-maleic anhydride copolymer chain moieties and polycaprolactam chain moieties bonded to each other as shown in FIG. 1, a fine dispersion of particles is observed and it is so fine as to be unexpected from the large difference in solubility parameter between the styrene-maleic anhydride copolymer and the polycaprolactam. Such dispersion of particles is apparently distinct from the state of dispersion observed in the electron micrograph of a mixture of a styrene-acrylonitrile copolymer and polycaprolactam as shown in FIG. 2.

Upon consideration of the above-mentioned significant difference in the dispersion state of particles, we have reached the conclusion that a thermoplastic polymeric material derived from a combination of (a) and (b), i.e. (a) a polyamide and (b) either a styrene copolymer or an unsaturated carboxylic acid ester copolymer shows a fine dispersion state of particles (disperse phase) having an average particle diameter of not greater than $5\mu$ only when a reaction is caused between the polymers whereby the polymeric material comprises predominantly a novel copolymer composed of polymer chains derived from the styrene copolymer or unsaturated carboxylic acid ester copolymer and polymer chains derived from the polyamide, both chains being chemically bound to each other. On the other hand, when no reaction is caused between the polymers or the combination of polymers is not reactive in itself as is the case with the combination of a styrene-acrylonitrile copolymer and a polyamide or a styrene-methyl methacrylic copolymer and a polyamide, the resulting dispersion state is so coarse that the disperse phase has an average particle diameter of greater than $5\mu$. The average diameter of disperse phase in such polymeric systems can be determined electron microscopically. If the disperse phase is spherical, only the diameter is measured. In the case of elliptic or rod-like disperse phase, a half of the sum of the major axis and the minor axis is taken as the particle diameter and the average diameter is then calculated.

As stated above, the thermoplastic polymeric material of the present invention has a sea-island microstructure in which a disperse phase (islands) is distributed in a continuous phase (matrix or sea). The polymers which constitute the continuous and disperse phases, respectively, depend on the relative amounts of the styrene copolymer and polyamide.

When evaluated as molding materials, those polymer blends in which any reaction between the polymeric components is not caused, for example, a resin mixture in the state of coarse dispersion which is prepared by melt kneading of a combination of a styrene-acrylonitrile copolymer and a polyamide or a styrene-methyl methacrylate copolymer and polyamide, are inferior in that the phenomenon of laminar peeling is observed in the molded articles formed from these mixtures by injection molding or other molding technique. In addition, these molded articles are inferior in the mechanical strength so that such unreacted polymer blends fail to provide satisfactory molded articles. On the contrary, with the thermoplastic polymeric materials of the present invention which show a fine dispersion state due to the reaction between the polymeric components and which predominantly comprise a novel copolymer composed of styrene copolymer or unsaturated carboxylic acid ester copolymer chain moieties and polyamide chain moieties chemically bonded to each other, no laminar peeling is observed in injection molded articles formed therefrom and satisfactory molded articles having superior mechanical strength can be obtained. In view of mechanical strength and abrasion resistance, it is preferred that the dispersed particles be as fine as possible. In the thermoplastic polymeric materials of the present invention, the average particle diameter of the disperse phase should not be greater than 5μ, preferably should not be greater than 2μ.

Now the novel copolymer in the thermoplastic polymeric material of the present invention is explained more fully. This novel copolymer is composed of two type of moieties bonded to each other, i.e., hard styrene copolymer or hard unsaturated carboxylic acid ester copolymer chain moieties containing dicarboxylic acid anhydride radicals and polyamide chain moieties.

Herein, the hard copolymers mean those which are not rubbers, but resins and have flexural modulus of not lower than $2 \times 10^3$ kg/cm², preferably not lower than $5 \times 10^3$ kg/cm² (measured at 23° C. according to ASTM D-790).

The hard styrene copolymer chain moieties which contains dicarboxylic acid anhydride radicals comprises (1) a structural unit represented by the formula:

wherein $R_1$ is hydrogen or an alkyl group, each $R_2$ is a hydrogen or halogen atom or an alkyl group and k is an integer; and (2) a structural unit represented by the formula:

wherein $R_3$ and $R_4$ are each a hydrogen or halogen atom or an alkyl group, both structural units being randomly distributed; or alternatively they further comprises, in addition to structural units (1) and (2), (3) a structural unit represented by the formula:

wherein $R_5$ and $R_6$ are each hydrogen or an alkyl group, again said structural units being all randomly distributed.

The monomers which constitute the above-mentioned structural unit (1) upon polymerization include styrene, α-methyl styrene, and various ring-substituted styrene derivatives including methylstyrene, butylstyrene and chlorostyrene. The monomers which constitute structural unit (2) are anhydrides of α,β-unsaturated dicarboxylic acids which are copolymerizable with the above monomers constituting structural unit (1), for example, maleic anhydride, methylmaleic anhydride, chloromaleic anhydride, citraconic anhydride, butenylsuccinic anhydride, tetrahydrophthalic anhydride, etc. The monomers which constitute structural unit (3) are esters of α,β-unsaturated carboxylic acids which are copolymerizable with the above monomers constituting structural unit (1) or (2). Exemplary of such esters are alkyl methacrylates such as methyl methacrylates and butyl methacrylate, alkyl acrylates such as methyl acrylate and butyl acrylate, and the like.

The individual structural units (1) and (2) or (1), (2) and (3) which constitute the styrene copolymer chain moieties are present in a proportion defined by the following equations:

(i) When the styrene copolymer comprises structural units (1) and (2):

$$\frac{i}{i+j} \times 100 = 85\text{-}98 \text{ (preferably 88-95)}$$

$$\frac{j}{i+j} \times 100 = 2\text{-}15 \text{ (preferably 5-12)}$$

wherein i and j are the moles of structural units (1) and (2), respectively; and (ii) When the styrene copolymer comprises structural units (1), (2) and (3):

$$\frac{l}{l+m+n} \times 100 = 40\text{-}96$$

$$\frac{m}{l+m+n} \times 100 = 2\text{-}30 \text{ (preferably 5-20)}$$

$$\frac{n}{l+m+n} \times 100 = 2\text{-}58 \text{ (preferably 5-50)}$$

wherein l, m, n are the moles of units (1), (2) and (3), respectively.

Particularly important is the proportion of structural unit (2) containing a dicarboxylic acid anhydride radical, which considerably affects the reactivity of the styrene copolymer with polyamides. A proportion of unit (2) in the above range affords particularly favorable results in terms of moldability and mechanical strength of the resulting polymeric material of the present invention. When structural unit (3) derived from an α,β-unsaturated carboxylic acid ester is incorporated in the styrene copolymer chain, further favorable results such as improved abrasion resistance of the polymeric material, better appearance of the moldings and increased processing flow properties in molding operation. Although the exact mechanism is not known, it is believed that the incorporation of structural unit (3) permits a more uniform reaction between the styrene copolymer and the polyamide, thereby providing a polymeric material having a more uniform and fine microstructure. This is supported electron microscopically.

On comparing electron micrographs, dispersed particles of 500 to 10,000 Å in diameter are observed with a methyl methacrylate-free copolymer (i.e., comprising styrene-maleic anhydride copolymer chain moieties and polycaprolactam chain moieties bonded to each other), while much finer dispersed particles of 100 to 1000 Å in diameter are observed with a methyl methacrylate-containing copolymer (i.e., comprising styrene-maleic anhydride-methyl methacrylate copolymer chain moieties and polycaprolactam chain moieties bonded to each other, said methyl methacrylate being introduced into the styrene copolymer chain moieties).

The styrene copolymer chain moieties may further comprises other structural unit or units derived from a monomer or monomers copolymerizable with the monomer which constitutes structural unit (1), (2) or (3), provided that the proportion of the other unit(s) is not so large as to cause an appreciable loss of the favorable performance of polystyrene. For example, one or more comonomers selected from acrylonitrile, acrylic acid, methacrylic acid and the like may be introduced into the styrene copolymer chain moieties in an amount of not more than 30 mole % (based on the styrene copolymer).

The hard unsaturated carboxylic acid ester copolymer chain moieties comprise an unsaturated carboxylic acid ester copolymer containing dicarboxylic acid anhydride radicals and having the above structural units (2) and (3) randomly distributed therein. As the monomers which constitute structural units (2) and (3), there can be desirably utilized the monomers as described in the preparation of hard styrene copolymer chain moieties. Among the above monomers which constitute structural unit (3), methyl methacrylate is preferred in order to obtain a harder copolymer. As for the proportion of each structural unit which constitutes unsaturated carboxylic acid copolymer chain moieties, the structural unit (2) is contained in a range of 2 to 30 mol%, preferably 2 to 15 mol%, most preferably 5 to 12 mol% in the unsaturated carboxylic acid ester copolymer. The unsaturated carboxylic acid ester copolymer chain moieties may further contain other structural unit or units derived from a monomer or monomers copolymerizable with the monomer which constitutes structural unit (3) or (2) within a range of not losing the preferable performance of the unsaturated carboxylic acid ester copolymer. For example, one or more comonomers such as styrene, acrylonitrile, acrylic acid, methacrylic acid and the like may be introduced in the unsaturated carboxylic acid copolymer chain moieties.

The styrene copolymer chain moieties or the unsaturated carboxylic acid ester copolymer chain moieties have a molecular weight of 30,000 to 300,000, preferably 50,000 to 200,000, most preferably 80,000 to 120,000. When the molecular weight of them is much lower, the preferable dispersion can not be obtained and the moldings obtained will have an unfavorably decreased mechanical strength. It is know that the decreased mechanical strength can be compensated by blending with another polymer of larger molecular weight, e.g., polystyrene or highimpact polystyrene, as suggested in U.S. Pat. No. 3,966,839 and British Pat. No. 1,440,030. However, in such blended composition the compatibility is poor so that when it is injection molded into an article of complicated shape the above-mentioned laminar peeling may occur. Also, an excessively high molecular weight of the copolymer chain moieties will bring about a novel copolymer having significantly decreased moldability which is not adequate to practical use.

Particularly, when the styrene copolymer is a binary copolymer consisting essentially of structural units (1) and (2), it is difficult to obtain a polymeric material having good mechanical properties because of crosslinking, thermal decomposition, etc. In such cases, a thermoplastic polymeric material having good mechanical strength can be obtained only when the styrene copolymer has a composition and molecular weight as defined above and it is sufficiently reacted with a polyamide. In contrast, in the case of a styrene terpolymer comprising structural units (1), (2) and (3), a thermoplastic polymeric material having good mechanical strength is readily obtained.

Exemplary of preferred styrene copolymers which constitute the styrene copolymer chain moieties are copolymers of styrene-maleic anhydride, styrene-maleic anhydride-acrylonitrile, styrene-maleic anhydride-methyl methacrylate, styrene-maleic anhydride-butyl acrylate, styrene-maleic anhydride-methacrylic acid, and the like. Of these, a styrene-maleic anhydride-methyl methacrylate copolymer is particularly preferred in terms of dimensional stability, rigidity, flow properties during molding, etc., of the resulting polymeric material.

Examples of the preferred unsaturated carboxylic acid ester copolymers which constitute the unsaturated carboxylic acid ester chain moieties include copolymers of methyl methacrylate-maleic anhydride, methyl methacrylate-acrylonitrile-maleic anhydride, methyl methacrylate-maleic anhydride-styrene, and the like.

The polyamide chain moieties are composed of a recurring structural unit represented by either of the formulae:

wherein each of x, y and z is an integer of 1 to 10, or they may be composed of a combination of these structural units. Preferably they are composed of a polyamide or copolyamide having a molecular weight in a range of 10,000 to 50,000 (polymerization degree of 100 or more), preferably 15,000 to 30,000. The polyamide of a much lower molecular weight cannot give a preferred dispersion so that the molded products obtained therefrom have an unfavorably decreased mechanical strength and heat distortion temperature. While, use of the polyamide having a much higher molecular weight leads to an undesirable decrease of moldability of thermoplastic resins.

Representative of preferred polyamides which constitute the polyamide chain moieties are polycaprolactam (nylon 6), polyhexamethylene adipamide (nylon 6,6), polyhexamethylene sebacamide (nylon 6,10), 6, 6/6, 10-type nylon copolymer, 6, 6/6-type nylon copolymer, and the like.

The proportion of either the hard styrene copolymer chain moieties or the unsaturated carboxylic acid ester copolymer chain moieties and the polyamide chain moieties in the novel copolymer of the present invention is such that the styrene copolymer or unsaturated carboxylic acid ester copolymer is contained in a range of 10 to 65%, preferably 30 to 55% by weight and the polyamide in the range of 90 to 35%, preferably 70 to 45% by weight. The most preferable proportion of either the styrene copolymer or the unsaturated carboxylic acid ester copolymer and the polyamide is within a range of 45 to 55:55 to 45% by weight, so far as there can be obtained the polymeric materials superior in dimensional stability, mechanical strength, moldability, etc. The above proportion of components influences the dispersion state in the polymeric material obtained and the polymeric material having a finely dispersed state cannot be obtained out of the above range of proportion.

The thermoplastic polymeric materials provided in accordance with the present invention are, as previously mentioned, those predominantly comprising a novel copolymer composed of styrene copolymer chain moieties or unsaturated carboxylic acid ester copolymer chain moieties and polyamide chain moieties bonded to each other. In other words, the thermoplastic polymeric materials may be composed of the novel copolymer alone, or a combination of the novel copolymer with the styrene copolymer or unsaturated carboxylic acid ester copolymer containing a dicarboxylic acid anhydride radical and the polyamide which remain unreacted. In addition, another thermoplastic polymer may be incorporated in the polymeric material of the present invention so long as such incorporation does not interfere with the finely dispersed microstructure of the material. For example, a polyamide, styrene-methyl methacrylate copolymer, styrene-acrylonitrile copolymer, ABS resin, MBS resin, high impact polystyrene or the like may be incorporated. In any event, the novel copolymer must comprise the major part, preferably at least 50% by weight of the polymeric material of the present invention.

The polymeric materials according to the present invention are thermoplastic by nature, and they are much superior to styrene polymers or polymethyl methacrylate in terms of resistance to chemicals, heat and abrasion, while they show greatly reduced molding shrinkage and greatly improved (decreased) hygroscopicity as compared with polyamides. They also possess a good dimensional stability. Because of these properties, they are useful as molding materials for use in the production of large-sized moldings and precision moldings. Also they are so improved in melt strength over polyamides that they are suitable for extrusion molding and blow molding. As a result, they can be used in the production of films, sheets, bottles and laminates and in wire coating. In addition, they are suitable for use as materials in the production of foams and fibers.

Various additives including pigments, dyes, thermal stabilizers, UV absorbers, plasticizers and nucreating agents that are conventionally used in plastics may be added to the polymeric materials of the present invention. Particularly, the weathering deterioration of the polymeric materials can be greatly controlled by adding an antioxidant selected from e.g., bisphenol, propionate and phosphite compounds, and/or a UV absorber selected from, e.g., phenyl salicylate, benzophenone and benzotriazole compounds.

It is also possible to use the thermoplastic polymeric materials as composite materials in combination with a fibrous reinforcing materials such as glass fiber, carbon fiber, aromatic polyamide fiber or asbestos and/or an inorganic filler such as calcium carbonate, talc, zinc oxide or silica. A significant improvement in heat resistance can be achieved, particularly by use of a composite of the present thermoplastic polymeric material with glass fiber, thereby providing a molding material with good mechanical properties. As a further favorable feature, such composite materials show a much better paintability than that of glass fiber-reinforced polyamides and glass fiber-reinforced polystyrenes. Furthermore, the composite materials according to the present invention are free from warpage, one of significant disadvantages inherent in glass fiber-reinforced polyamides. Accordingly, they will provide the most preferable molding materials that have ever been proposed in the field of the production of large-sized moldings such as automobile parts and appliance parts and precision moldings.

There can also be obtained a preferred resin composition having remarkably improved mechanical strength such as flexural elastic modulus, rigidity, etc., good dimentional stability and paintability and excellent moldability by compounding the present polymeric material with carbon fiber.

The content of glass- or carbon-fiber contained in the glass- or carbon-fiber reinforced composition is in a range of 5 to 60%, preferably 10 to 40% by weight in order to obtain the composition having good mechanical strength and moldability.

As previously mentioned, the thermoplastic polymeric material of the present invention can be used as a blend with another class of thermoplastic polymer.

The thermoplastic polymeric material of the present invention can be prepared by reacting under melt kneading 10 to 65% by weight of a hard copolymer containing an $\alpha, \beta$-unsaturated dicarboxylic acid anhydride as a commonomer with 90 to 35% by weight of a polyamide at a high shearing rate. The reaction of these polymers under melt kneading conditions can be effected using a conventional melt kneading or compounding apparatus for resins such as a kneader, Banbury mixer or twin screw extruder. For this purpose, it is necessary to carry out the melt kneading of the polymers at a shearing rate of not lower than 100 sec$^{-1}$. If the shearing rate is lower, the preferable dispersion state cannot be obtained.

The temperature at which melt kneading is conducted is in a range of 240° to 330° C., preferably 260° to 300° C. If the temperature at which the melt kneading is carried out is much lower, the desired reaction is hardly caused. A much higher temperature may induce thermal degradation of the polymers and is therefore unfavorable. When styrene copolymer further comprises structural unit (3), it has a better affinity and hence a higher reactivity for polyamides so that the temperature at which the melt kneading is carried out can be selected from a wider range. In any case, important factors in the preparation of the present polymeric material are the shearing rate and temperature during the melt kneading.

The polymeric material of the present invention can be produced under the absence of a radical generating catalyst.

The preferred hard copolymer containing an $\alpha,\beta$-unsaturated dicarboxylic acid anhydride as comonomer used herein is the fore-mentioned styrene copolymer or unsaturated carboxylic acid ester copolymer.

The styrene copolymer or unsaturated carboxylic acid ester copolymer which is used herein may be prepared from a mixture of monomers which constitute the abovementioned structural units (1) plus (2), or structural units (3) plus (2) by allowing the mixture to polymerize. Preferably the styrene copolymer of unsaturated carboxylic acid ester copolymer comprises structural units (2) and either (1) or (3) distributed randomly throughout the copolymer. If these structural units are distributed unevenly, the reaction of the copolymer with a polyamide is not achieved uniformly. As one approach for obtaining a copolymer in which the monomers are randomly distributed, it is known that an additional amount of the monomer that is consumed at a higher rate is added in the course of polymerization in order to overcome the difference in reactivity between the monomers. Such approach can be utilized in the preparation of the styrene copolymer or unsaturated carboxylic acid ester copolymer comprising structural units (2) and either (1) or (3).

In the production of the polymeric materials having a good dispersion state by use of melt kneading, the important factors are the proportion of the hard copolymer and the polyamide, the molecular weights of the hard copolymer and the polyamide and the composition of the hard copolymer. The proportion of the hard copolymer and the polyamide is as described hereinbefore. The significant difference of properties of the obtained polymeric materials caused by varying the mixing proportion of the hard copolymer and the polyamide may be understood from the following results.

Figure 3:
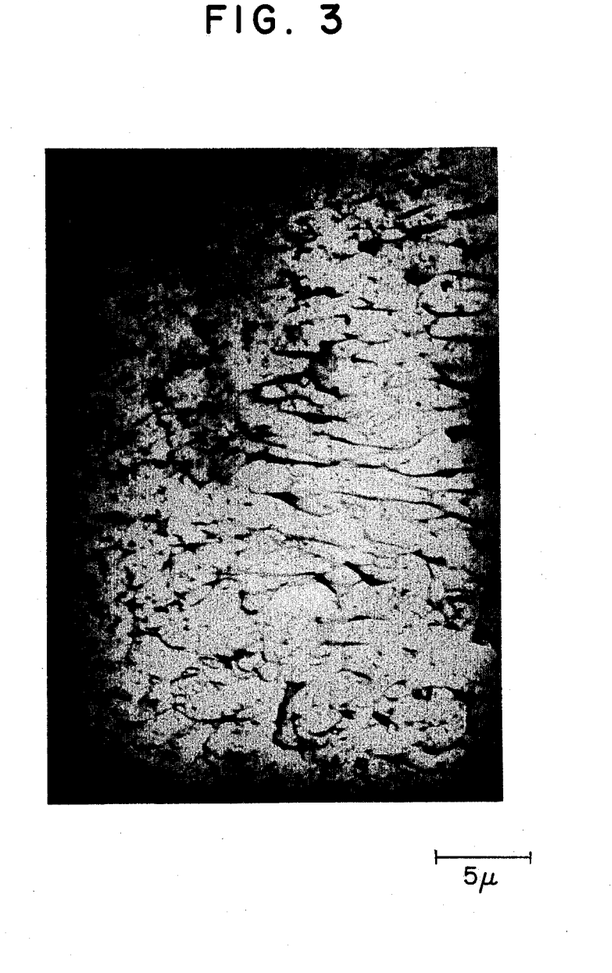
FIG. 3 shows an electron micrograph of a resin obtained from 70 parts by weight of styrene-maleic anhydride copolymer and 30 parts by weight of polycaprolactam.

As for the relation between the mixing proportion of the hard copolymer and the polyamide and the dispersion state of the resultant polymeric materials, there can be obtained the polymeric material having a finely dispersed state as shown in FIG. 1 in case of the proportion of 50% by weight of the hard copolymer and 50% by weight of the polyamide, which is one of the preferred embodiments of the present invention. While, the polymeric material having such a coarsely dispersed state as illustrated in FIG. 3 is produced in case of the proportion of 70% by weight of the hard copolymer and 30% by weight of the polyamide.

Figure 4:
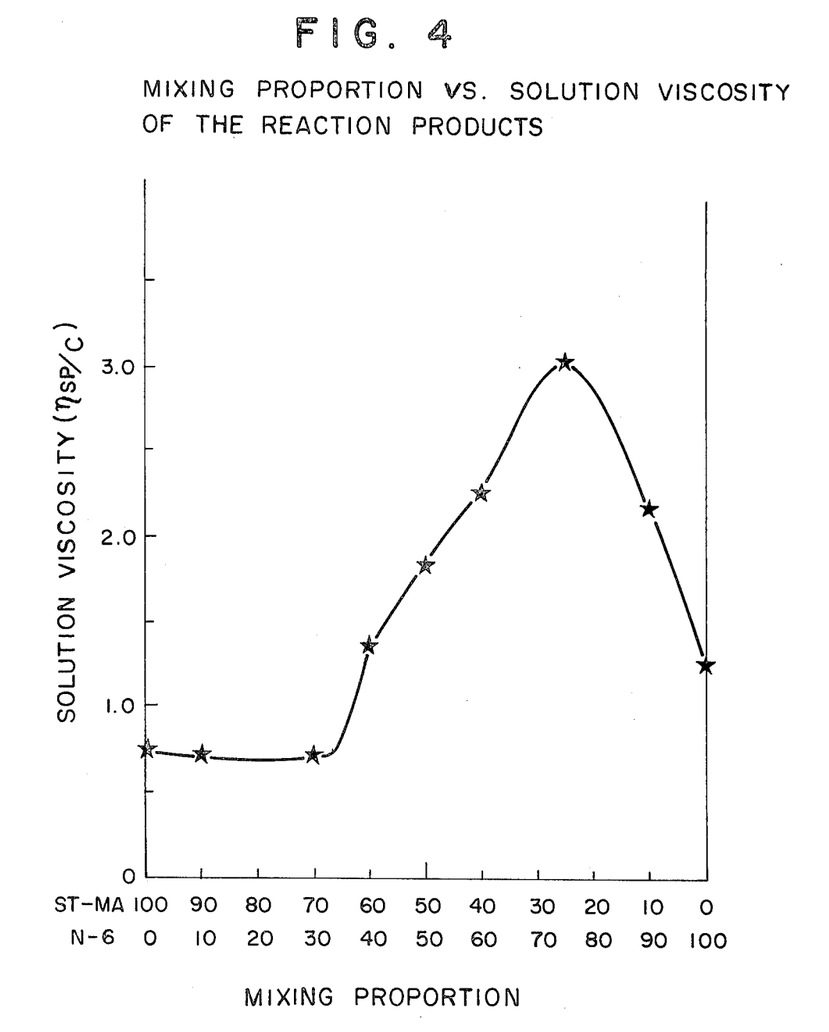
FIG. 4 represents a relation between a mixing proportion of the styrene-maleic anhydride copolymer and polycaprolactam and a solution viscosity of the polymer obtained by melt kneading them.

There can also be found such a strange phenomenon that a solution viscosity (molecular weight) of the polymeric material obtained is remarkably changed according to the variation of the mixing proportion of the hard copolymer and the polyamide. FIG. 4 represents the relation between the mixing proportion of the hard copolymer and the polyamide and the solution viscosity of the resulting polymeric material. It may be easily found from FIG. 4 that the polymeric material of the present invention obtained from 10 to 65% by weight of the hard copolymer and 90 to 35% by weight of the polyamide has a higher solution viscosity than that of the hard copolymer or the polyamide used, itself, so that it has a remarkably increased molecular weight. On the contrary, when the content of the hard copolymer is above 65% by weight and the content of the polyamide is below 35% by weight, there cannot be seen such an effect of an increment of molecular weight as described above and the solution viscosity of the resultant polymeric material is similar to that of the hard copolymer utilized, itself. In view of the above phenomenon, the effect of an increment of molecular weight is thought to enable the production of desirable fine dispersed state. From this, the mixing proportion of the hard coplymer and the polyamide is one of important factors to produce the polymeric material having a preferred dispersion state.

The molecular weights of the hard copolymer and the polyamide are important to obtain the preferred polymeric material of the present invention. The balance of molecular weight between the hard copolymer and the polyamide is important in order to obtain the preferable dispersion state under melt kneading. When one of two polymers has a much lower molecular weight, there cannot be obtained the well melt kneaded state so that the desirable polymeric material cannot be produced. While, one polymer having a much higher molecular weight cannot provide the well melt kneaded state, either.

Furthermore, the composition of the hard copolymer, itself, particularly, the content of $\alpha,\beta$-unsaturated dicarboxylic acid anhydride is important. The content is in a range of 2 to 30 mol%, preferably 2 to 25 mol%, most preferably 5 to 12 mol%. When the content of $\alpha,\beta$-unsaturated dicarboxylic acid anhydride is much lower, the mix of the hard copolymer with the polyamide cannot provide a good dispersion state. When the content of the said anhydride is much higher, it is difficult to obtain the preferred polymeric material due to the production of the geled product and the thermal decomposition of polymers.

The hard coplymers that are used in the present invention also contain rubber-reinforced copolymers, which are prepared by copolymerizing the monomer mixture in the presence of a rubber-like, elastomeric polymer such as polybutadiene, styrene-butadiene copolymer rubber or ethylene-propylene copolymer rubber. Preferable examples are rubber-reinforced styrene-maleic anhydride copolymer, rubber-reinforced styrene-methyl methacrylate-maleic anhydride copolymer, rubber-reinforced styrene-acrylonitrile-maleic anhydride copolymer, rubber-reinforced methyl methacrylate-maleic anhydride copolymer and the like.

The following examples are given to further illustrate the present invention without limiting the invention thereto.

EXAMPLE 1 & Comparative Example 1

Fifty (50) parts by weight or polycaprolactam of 18,000 number average molecular weight were blended in pellet form with 50 parts by weight of a styrene-maleic anhydride-methyl methacrylate terpolymer of 90,000 number average molecular weight (as measured by GPC) containing 9 mol% maleic anhydride and 8 mol% methyl methacrylate (Example 1) or 50 parts by weight of a styrene-methyl methacrylate copolymer of 90,000 number average molecular weight containing 8 mol% methyl methacrylate (Comparative Example 1) and the blend was then melt-kneaded at 260° C. and a shearing rate of 400 sec$^{-1}$ using a twin screw extruder. The resulting reaction product (Example 1) or mixture (Comparative Example 1) was then assessed by the following tests.

(1) Observation on electron microscope:

The electron micrograph of the reaction product of styrene-maleic anhydride-methyl methacrylate terpolymer and polycaprolactam according to the present invention showed very fine dispersion of particles of 100 to 1000 Å in size. On the contrary, in the electron micrograph of the mixture of styrene-methyl methacrylate copolymer and polycaprolactam coarse dispersion of particles of 6$\mu$ or greater was found and the incompatible nature between the two polymers was thereby estimated. Thus, significant differences between these electron micrographs are noted.

(2) Solvent fractionation test:

A 10 gram sample each of the reaction product (Example 1) and the mixture (Comparative Example 1) was weighed and dissolved in cresol. Both were completely dissolved remaining no insolubles. The resulting cresol solution was then added to a large amount of methyl ethyl ketone to completely separate out a precipitate, which was then collected [said collected polymer being referred to as Polymer (I)]. In the case of the reaction product, Polymer (I) weighed 8.1 g while Polymer (I) derived from the mixture weighed 5.1 g. From the remaining solution (mother liquor) the dissolved polymer [Polymer (II)] was recovered. In the case of the reaction product, Polymer (II) weighed 1.8 g, while Polymer (II) recovered from the mixture weighed 4.9 g. Subsequently polymers (I) and (II) were subjected to infrared spectroscopic analysis. In the case of the reaction product, both Polymers (I) and (II) showed the spectrum each of the styrene-maleic anhydride-methyl methacrylate terpolymer and polycaprolactam, whereas in the case of the mixture, the spectrum of Polymer (I) corresponded to that of polycaprolactam and the spectrum of Polymer (II) corresponded to that of the styrene-methyl methacrylate copolymer.

It is apparent from the results of the solvent fractionation test that the styrene-maleic anhydride-methyl methacrylate terpolymer and the polycaprolactam are bonded to each other to form a copolymer. From the facts that the amount of Polymer (II) recovered from the reaction product is relatively small and that this Polymer (II) shows the infrared absorption spectra of both the styrene-maleic anhydride-methyl methacrylate terpolymer and polycaprolactam in the proportion of 65% styrene terpolymer and 35% polycaprolactam, there is little possibility for the presence of styrene-maleic anhydride-methyl methacrylate terpolymer which is not bonded to polycaprolactam.

(3) Solubility test:

In the solubility test the reaction product is examined for the presence of polycaprolactam which is not bound to the styrene-maleic anhydride-methyl methacrylate terpolymer.

The following three samples were prepared:

Sample A: a solution of 1 g of the reaction product in 100 ml of cresol;

Sample B: a solution of 1 g of the mixture in 100 ml of cresol; and

Sample C: a solution of 0.1 g of polycaprolactam in 100 ml of cresol.

To a 5 ml aliquot of each sample was added 40 ml of toluene and the resulting solution was allowed to stand for 4 days. After 4 days, no precipitate was observed in the solution containing Sample A, while polymeric precipitates separated out in the solutions containing Samples B and C, respectively. In view of the fact that a precipitate separated out even in a solution having a low polycaprolactam concentration such as Sample C, there is little possibility for the presence of polycaprolactamin in the reaction product which is not bound to the styrene-maleic anhydride-methyl methacrylate terpolymer.

From the results of these tests, it is thought that the novel copolymer which is composed of the styrene-maleic anhydride-methyl methacrylate terpolymer and polycaprolactam bonded to each other comprises substantially all the portion of the reaction product and that the physical properties of the reaction product as described below are attributable to those of the novel copolymer.

From the facts that only the styrene copolymer remained after the reaction product had been dissolved and disintegrated in concentrated hydrochloric acid and that on thermal analysis the reaction product showed a peak near the melting point of polycaprolactam, it is apparent that both the styrene-maleic anhydride-methyl methacrylate terpolymer chains and polycaprolactam chains are present in the reaction mixture.

Test pieces were prepared from the reaction product, the mixture, the styrene-maleic anhydride-methyl methacrylate terpolymer and a styrene-methyl methacrylate copolymer by injection molding and the tensile strength, Izod impact strength and heat distortion temperature of these test pieces were determined in accordance with JIS Test Method K 6871. Melt flow index of these materials was also determined in accordance with ASTM D 1238 (under the condition of 230° C. and 3.8 kg loading). A peeling test was applied to these moldings in order to evaluate the degree of peeling. According to the test, a strip of adhesive tape was applied to the rupture cross-section of a test piece and then removed and the degree of peeling was visually evaluated.

The results are summarized in Table-1 below. As can be seen in the table, the reaction product is much improved in both tensile strength and impact strength over the styrene-maleic anhydride-methyl methyacrylate terpolymer, while the mixture does not show improvement in strength over the styrene-methyl methacrylate copolymer. The melt flow index of the reaction product is much lower than that of the styrene-maleic anhydride-methyl methacrylate terpolymer (or the melt viscosity of the former is much higher than the latter). In contrast the melt flow index of the mixture is much higher than that of the styrene-methyl methacrylate copolymer (or the melt viscosity of the former is much lower than the latter).

TABLE 1

| Resin | Example 1 ST-MA-MMA/N-6 Reaction Product | ST-MA-MMA | Comp. Ex. 1 ST-MMA/N-6 Mixture | ST-MMA |
|---|---|---|---|---|
| Tensile Strength (kg/cm$^2$) | 750 | 540 | 510 | 520 |
| Izod Impact Strength (kg · cm/cm Unnotch) | 38 | 12 | 12 | 12 |
| Heat Distortion Temp. (°C.) | 115 | 103 | 103 | 95 |
| Melt Flow Index (g/10 min.) | 1.7 | 3.2 | 28 | 6 |
| State of Dispersion (on Electron Microscope) | Fine (About 1000 Å) | — | Coarse & Uneven (About 10μ) | — |
| Peeling of Molding | None | — | Severe | — |

ST-MA-MMA: Styrene-maleic anhydride-methyl methacrylate terpolymer
ST-MMA: Styrene-methyl methacrylate copolymer
N-6: Polycaprolactam (Nylon 6)

EXAMPLE 2

A reaction was carried out in the same way as in Example 1 except that the styrene terpolymer containing 9 mol% maleic anhydride and 8 mol% methyl methacrylate was replaced by another styrene-maleic anhydride-methyl methacrylate terpolymer of 90,000 number average molecular weight containing large proportions of comonomers (i.e., containing 20 mol% maleic anhydride and 20 mol% methyl methacrylate). The resulting reaction product was examined by the solvent fractionation test as described in Example 1 whereby the formation of a novel copolymer composed of styrene copolymer chains and polycaprolactam chains bonded to each other was confirmed. On electron microscopic examination, a fine dispersion of particles (disperse phase) of not greater than 2μ was observed. Physical properties of injection molded test piece were also determined and the results are given in Table-2 below.

EXAMPLE 3

A reaction was carried out in the same way as in Example 1 except that the styrene-maleic anhydridemethyl methacrylate terpolymer used in Example 1 was replaced by a styrene-maleic anhydride-methacrylic acid terpolymer (containing 8 mol% maleic anhydride and 6 mol% methacrylic acid). Again in this example, the formation of a novel copolymer composed of styrene copolymer chains and polycaprolactam chains bonded to each other as well as a fine dispersion of particles of not greater than 2μ were confirmed. The data of physical properties are given in Table-2.

EXAMPLE 4

Following the procedure of Example 1 except that polyhexamethylene adipamide of 16,000 number average molecular weight was substituted for the polycaprolactam and the blend was melt-kneaded at 280° C., a reaction was carried out. The formation of a novel copolymer composed of styrene copolymer chains and polyhexamethylene adipamide chains bonded to each other and a fine dispersion of particles of 5μ or less were confirmed also in this example. The data of physical properties are given in Table-2.

TABLE 2

| Resin | Example 2 ST-MA-MMA/ N-6 Reaction Product | Example 3 ST-MA-MAA/ N-6 Reaction Product | Example 4 ST-MA-MMA/ N-6,6 Reaction Product |
|---|---|---|---|
| Tensile Strength (kg/cm²) | 760 | 740 | 750 |
| Izod Impact Strength (kg · cm/cm Unnotch) | 35 | 43 | 46 |
| Heat Distortion Temp. (°C.) | 125 | 116 | 116 |
| Melt Flow Index (g/10 min.) | 2.2 | 1.3 | — |
| Peeling of Molding | None | None | None |

ST-MA-MMA: Styrene-maleic anhydride-methyl methacrylate terpolymer
ST-MA-MAA: Styrene-maleic anhydride-methacrylic acid terpolymer
N-6: Polycaprolactam (Nylon 6)
N-6,6: Polyhexamethylene adipamide (Nylon 6,6)

EXAMPLE 5

Following the procedure of Example 1 except that the styrene-maleic anhydride-methyl methacrylate terpolymer was replaced by a styrene-maleic anhydride copolymer of 90,000 number average molecular weight (containing 9 mol% maleic anhydride), a reaction was carried out. Also in this example, a novel copolymer composed of styrene copolymer chains and polycaprolactam chains bonded to each other was confirmed. FIG. 1 shows an electron micrograph of the reaction product, in which a fine dispersion of particles of 500 to 10,000 Å was observed. The data of physical properties and abrasion resistance are given in Table-3 along with those of the reaction product obtained in Example 1.

TABLE 3

| Resin | Example 1 ST-MA-MMA/N-6 Reaction Product | Example 5 ST-MA/N-6 Reaction Product |
|---|---|---|
| Tensile Strength (kg/cm²) | 750 | 710 |
| Izod Impact Strength (kg ·Unnotch) | 38 | 39 |
| Heat Distortion Temp. (°C.) | 115 | 112 |
| Melt Flow Index (g/10 min.) | 1.7 | 0.2 |
| State of Dispersion | Fine (100–1000Å) | Fine (500–10000Å) |
| Peeling of Molding | None | None |
| Appearance of Molding* | 70 | 50 |
| Abrasion Loss (mg) | 22 | 42 |

ST-MA-MMA: Styrene-maleic anhydride-methyl methacrylate terpolymer
ST-MA: Styrene-maleic anhydride copolymer
N-6: Polycaprolactam (Nylon 6)
*The appearance of molding is expressed as % light reflectance on the surface of the molding.

COMPARATIVE EXAMPLE 2

The melt kneading procedure of comparative Example 1 was repeated using a styrene-acrylonitrile copolymer (containing 30% by weight of acrylonitrile) in place of the styrene-methyl methacrylate copolymer. On electron microscopic examination of the resulting mixture, a coarse dispersion of particles on the order of 10μ was observed. FIG. 2 shows an electron micrograph of the mixture. In addition, a severe peeling was noted in the peeling test of an injection molded test piece. The data of physical properties are given in Table-4 along with those of the reaction product obtained in Example 5.

TABLE 4

| Resin | Example 5 ST-MA/N-6 Reaction Product | Comparative Example 2 ST-AN/N-6 Mixture |
|---|---|---|
| Tensile Strength (kg/cm²) | 710 | 470 |
| Izod Impact Strength (kg · cm/cm Unnotch) | 39 | 11 |
| Heat Distortion Temp. (°C.) | 112 | 103 |
| State of Dispersion | Fine (FIG. 1) (500–10000Å) | Inhomogeneous (FIG. 2) (About 10μ) |
| Peeling of Molding | None | Remarkable |

ST-MA: Styrene-maleic anhydride copolymer
ST-AN: Styrene-acrylonitrile copolymer
N-6: Polycaprolactam (Nylon 6)

EXAMPLES 6 TO 9 & COMPARATIVE EXAMPLES 3 AND 4

Melt kneading was carried out in the same way as in Example 5 by varying the proportion of the styrene-maleic anhydride copolymer of 90,000 number average molecular weight and polycaprolactam of 18,000 number average molecular weight used in Example 5 as shown in Table-5. Then, physical properties were measured. Also, the solution viscosity of 0.5% by weight of a polymer in the mixed solvent of 90% by weight of m-cresol and 10% by weight of methyl ethyl ketone was measured as a measure of molecular weight of the resulted reaction product. The results are shown in Table-5. When the proportions of the styrene-maleic anhydride copolymer and polycaproractum are 90 to 10 and 70 to 30 as shown in Comparative Examples 3 and 4, respectively, the solution viscosities of the reaction products obtained are almost similar to that of the styrene-maleic anhydride copolymer.

However, when the proportions are within a range of values as shown in Examples 5 to 9, the solution viscosities of the reaction products are higher than those of the styrene-maleic anhydride copolymer and polycaprolactum, which are the polymers to be blended. In FIG. 4, there is shown the relation between a mixing proportion and a solution viscosity of the polymer obtained. The mixture in Comparative Example 4 does not show such a finely dispersed state as seen in the electron micrograph of FIG. 3. On the contrary, the fine dispersion as illustrated in FIG. 1 was observed in Examples 5 to 9. The resins produced in Comparative Examples 3 and 4 are also found to be inferior in mechanical strength such as tensile strenth, Izod impact strength, etc. It can be understood from the above results that the mixing proportion of the styrene-maleic anhydride copolymer and polycaprolactum influences the properties, etc. of the resultant products.

EXAMPLE 11

Following the procedure of Example 5 except that polyhexamethylene adipamide of 16,000 number average molecular weight was substituted for the polycaprolactam and the blend was melt-kneaded at 280° C., a reaction was carried. Also in this example, the formation of a novel copolymer composed of styrene copolymer chain moieties and polyamide chain moieties bonded to each other and a fine dispersion of particles of not greater than 5μ were confirmed. The data of physical properties are given in Table-6 below.

COMPARATIVE EXAMPLE 5

A reaction was carried out in the same way as in Example 5 except that the styrene-maleic anhydride copolymer was replaced by a low molecular weight styrenemaleic anhydride copolymer having a number average molecular weight of 3500 and containing 35 mol% maleic anhydride. The data of physical properties of the resulting reaction product are given in Table-6. As compared with the case where a high molecular weight styrene-maleic anhydride copolymer was used (i.e., Example 5), a significant decrease in mechanical strength was noted and the product obtained in this example was therefore not suitable for use as a molding material.

TABLE 5

|  | Comparative Example 3 | Comparative Example 4 | Example 6 | Example 5 | Example 7 | Example 8 | Example 9 |
|---|---|---|---|---|---|---|---|
| Proportion ST-MA | 100 | 90 | 70 | 60 | 50 | 40 | 25 | 10 | 0 |
| N-6 | 0 | 10 | 30 | 40 | 50 | 60 | 75 | 90 | 100 |
| Tensile Strength (kg/cm$^2$) | 550 | 470 | 520 | 700 | 710 | 740 | 760 | 790 | 770 |
| Izod Impact Strength (kg · cm/cm Unnotch) | 15 | 10 | 12 | 28 | 39 | 55 | 60< | 60< | 60< |
| Solution Viscosity ($\eta$sp/c) | 0.76 | 0.75 | 0.75 | 1.35 | 1.80 | 2.25 | 3.05 | 2.00 | 1.26 |
| State of Dispersion | — | Not Fine | Not Fine (FIG. 3) | Fine (500~20000Å) | Fine (FIG. 1) (500~10000Å) | Fine (500~10000Å) | Fine (500~10000Å) | Fine (500~10000Å) | |

N-6: Polycaprolactam
ST-MA: Styrene-maleic anhydride copolymer

EXAMPLE 10

The similar reaction as Example 5 was carried out using a styrene-maleic acid anhydride-acrylonitrile copolymer (maleic acid anhydride content of 8 mol % and acrylonitrile of 15%) having number average molecular weight of 50,000 in place of the styrene-maleic acid anhydride copolymer in Example 5. The solvent fractionation as described in Example 1 was conducted. A copolymer in which the styrene copolymer chain and the polycaprolactam chain was bound each other and a dispersion of particles of not greater than 2μ were identified. Measurement of the physical properties was carried out, with the results as set forth in Table-6.

EXAMPLE 12

A reaction was carried out in the same way as in Example 5 except that the styrene-maleic anhydride copolymer used in Example 5 was replaced by a methyl methacrylate-maleic anhydride-styrene copolymer of 85,000 number average molecular weight (containing 6 mol% maleic anhydride and 15 mol% of styrene). The data of physical properties are given in Table-6. Also in this example, there were confirmed the formation of a novel copolymer composed of methyl methacrylate copolymer chain moieties and polycaprolactum chain moieties bonded to each other and a fine dispersion of particles of not greater than 2μ.

TABLE 6

| Resin | Example 10 ST-MA-AN/N-6 Reaction Product | Example 11 SMA/N-6,6 Reaction Product | Comparative Example 5 low molecular SMA/N-6 Reaction Product | Example 12 MMA-MA-ST/N-6 Reaction Product |
|---|---|---|---|---|
| Tensile Strength (kg/cm$^2$) | 700 | 750 | 350 | 800 |
| Izod Impact Strength (kg · cm/cm Unnotched) | 35 | 45 | 15 | 45 |
| Heat Distortion Temp. (°C.) | 110 | 115 | — | 113 |
| Melt Flow Index (g/10 min) | 1.3 | — | 15 | 2.2 |

TABLE 6-continued

| Resin | Example 10 ST-MA-AN/N-6 Reaction Product | Example 11 SMA/N-6,6 Reaction Product | Comparative Example 5 low molecular SMA/N-6 Reaction Product | Example 12 MMA-MA-ST/N-6 Reaction Product |
|---|---|---|---|---|
| Peeling of Molding | None | None | None | None |

ST-MA-AN: Styrene-maleic anhydride-acrylonitrile copolymer
SMA: Styrene-maleic anhydride copolymer
MMA-MA-ST: Methyl methacrylate-maleic anhydride-styrene copolymer
N-6: Polycaprolactam (Nylon-6)
N-6,6: Polyhexamethylene adipamide (Nylon-6,6)

The data of abrasion resistances and chemical resistances of the styrene-maleic acid anhydride-methyl methacrylate copolymer used in Example 1 and of the reaction product of Example 1 are given in Table-7, wherein the abrasion resistance is expressed as abrasion loss (mg) on a Taber abrasion test machine, and the chemical resistance is expressed as % critical strain at which a crack occurs when the test piece is in contact with the chemical. Table-8 shows the data of % molding shrinkage during injection molding of the polycaprolactam used in Example 1 and of the reaction product of Example 1. The shrinkage was measured with a plate of 3 mm thickness and each length of 150 mm. Table-9 shows % water absorption of polycaprolactam and of the reaction product of Example 1, which was calculated from the weight gain after an injection molded test piece was immersed in hot water at 80° C. for 40 minutes.

TABLE 7

| | Abrasion Loss (mg) | Chemical Resistance (% Critical Strain) | |
|---|---|---|---|
| | | Ethanol | Gasoline |
| Reaction Product of Example 1 | 22 | 0.64 | >0.70 |
| ST-MA-MMA Copolymer* | 85 | 0.15 | 0.08 |

*The styrene-maleic acid anhydride-methyl methacrylate copolymer used in Example 1.

TABLE 8

| | % Molding Shrinkage |
|---|---|
| Reaction Product of Ex. 1 | 0.81 |
| Polycaprolactam | 1.53 |

TABLE 9

| | % Water Absorption |
|---|---|
| Reaction Product of Ex. 1 | 0.8 |
| Polycaprolactam | 1.7 |

EXAMPLE 13

To 100 parts by weight of the reaction product obtained in Example 1 were added 0.5 part of Irganox [trademark] 1076 (Ciba-Geigy) and 0.5 part of Tinuvin [trademark] 327 (Ciba-Geigy) both as stabilizers, and the mixture was melt-blended on an extruder to give a resin composition. The composition thus obtained and the reaction product of Example 1 were subjected to weathering deterioration test. According to the test, a test piece was exposed to a sunshine weather-ometer for 200 hours, whereupon the tensile strength, elongation and degree of yellowing were evaluated. The results are summarized in Table-10, from which the remarkable effect of the stabilizers will be obvious.

TABLE 10

| | Properties after 200 hours exposure to sunshine weather-ometer | | |
|---|---|---|---|
| | Tensile Strength (kg/cm$^2$) | % Elongation | Yellowing |
| Stabilized Composition of Example 13 | 630 | 70 | Slight |
| Reaction Product of Example 1 | 550 | 3 | Strong |

EXAMPLE 14

Eighty (80) parts of the reaction product obtained in Example 1 and 20 parts of glass fiber were mixed and the mixtue was kneaded at 250° to 270° C. in a vented extruder. The physical properties and paintability of the resulting reinforced composition were evaluated. The paintability was evaluated by coating a molded test piece with an acrylic paint and then visually observing the appearance of the coated molding. The adhesion of the coating was also evaluated with a coated test piece after it had been conditioned in a moist atmosphere of at least 98% relative humidity at 50° C. for 72 hours. The result is shown in Table-11 along with the results obtained with a glass fiber-reinforced polystyrene (Comparative Example 6) and a glass fiber-reinforced nylon 6 (Comparative Example 7), It can be seen from the table that the glass fiber-reinforced resin composition of the present invention shows a good heat resistance and paintability as well as excellent mechanical properties.

EXAMPLE 15

64 parts of the reaction product produced in Example 1, 16 parts of styrene-acrylonitrile copolymer (TYRIL ®783; manufactured by Asahi-Dow Ltd.) and 20 parts of glass fiber were blended together to obtain a glass fiber-reinforced resin composition. The data of physical properties and paintability are shown in Table-11.

TABLE 11

| | Properties of glass fiber-reinforced resins | | | |
|---|---|---|---|---|
| Resin | Example 14 Reaction Product of Ex. 1 | Example 15 Reaction Product of Ex. 1/ST-AN Copolymer | Comp. Ex. 6 Polystyrene | Comp. Ex. 7 Nylon 6 |
| % Glass Fiber | 20 | 20 | 20 | 20 |
| Tensile Strength (kg/cm$^2$) | 1,100 | 1,000 | 850 | 1,200 |
| Flexural Strength (kg/cm$^2$) | 1,500 | 1,450 | 1,000 | 1,700 |
| Flexural Modulus (kg/cm$^2$) | 60,000 | 62,000 | 60,000 | 64,000 |
| Izod Impact Strength (kg · cm/cm Notched) | 5 | 5 | 2 | 5 |
| Heat Distortion Temp. (°C.) | 185 | 160 | 102 | 210 |
| Appearance of Coated Molding | Good | Good | Poor | Good |
| Adhesion of Coating | Good | Good | Good | Poor |

EXAMPLE 16

A blend of 70 parts of the reaction product produced in Example 1 and 30 parts of carbon fiber was melt kneaded at 260° to 290° C. in a twin extruder to obtain a carbon fiber reinforced resin composition. From the data of physical properties, there was obtained a resin composition having a heat distortion temperature of 180° C., Izod impact strength of 4 kg.cm/cm, flexural strength of 1,900 kg/cm$^2$ and flexural modulus of 125,000 kg/cm$^2$. The resin composition had particularly high rigidity and excellent mechanical strength.

What is claimed is:

1. A thermoplastic polymeric material predominantly comprising a novel copolymer, said novel copolymer being composed of polymer chain moieties A having a molecular weight of 30,000 to 300,000 derived from a hard styrene copolymer and polymer chain moieties B having a molecular weight of 10,000 to 50,000 derived from a polyamide, said polymer chain moieties A and B being chemically bonded to each other, said styrene copolymer including 2 to 30 mol% of $\alpha,\beta$-unsaturated dicarboxylic acid anhydride and a styrene compound, said styrene copolymer being contained in a range of 10 to 65% by weight based on the weight of the said novel copolymer, said polyamide being contained in a range of 90 to 35% by weight based on the weight of the said novel copolymer and said polymeric material having a fine dispersion microstructure of not greater than 5$\mu$ in avarage particle diameter of the disperse phase.

2. A thermoplastic polymeric material according to claim 1 having an ultrafine dispersion microstructure of not greater than 2$\mu$ in average particle diameter of the disperse phase.

3. A thermoplastic polymeric material according to claim 1 or 2 wherein the styrene copolymer comprises 85 to 98 mol% of styrene compound and 15 to 2 mol% of $\alpha,\beta$-unsaturated dicarboxylic acid anhydride.

4. A thermoplastic polymeric material according to claim 1 or 2 wherein the styrene copolymer comprises 40 to 96 mol% of styrene compound, 2 to 30 mol% of $\alpha,\beta$-unsaturated dicarboxylic acid anhydride and 2 to 58 mol% of $\alpha,\beta$-unsaturated carboxylic acid ester.

5. A thermoplastic polymeric material according to claim 1 or 2 wherein the styrene copolymer comprises 50 to 96 mol% of styrene compound, 2 to 30 mol% of $\alpha,\beta$-unsaturated dicarboxylic acid anhydride and 2 to 20 mol% of unsaturated nitrile.

6. A thermoplastic polymeric material predominantly comprising a novel copolymer, said novel copolymer being composed of polymer chain moieties A having a molecular weight of 30,000 to 300,000 derived from a hard unsaturated carboxylic acid ester copolymer and polymer chain moieties B having a molecular weight of 10,000 to 50,000 derived from a polyamide, said polymer chain moieties A and B being chemically bonded to each other, said unsaturated carboxylic acid ester copolymer including 2 to 30 mol% of $\alpha,\beta$-unsaturated dicarboxylic acid anhydride and $\alpha,\beta$-unsaturated carboxylic acid ester, said unsaturated carboxylic acid ester copolymer being contained in a range of 10 to 65% by weight based on the weight of the said novel copolymer, said polyamide being contained in a range of 90 to 35% by weight based on the weight of the said novel copolymer and said polymeric material having a fine dispersion microstructure of not greater than 5$\mu$ in average particle diameter of the disperse phase.

7. A thermoplastic polymeric material according to claim 6 wherein the unsaturated carboxylic acid ester copolymer comprises 70 to 98 mol% of $\alpha,\beta$-unsaturated carboxylic acid ester and 30 to 2 mol% of $\alpha,\beta$-unsaturated dicarboxylic acid anhydride.

8. A thermoplastic polymeric material according to claim 6 wherein the unsaturated carboxylic acid ester copolymer comprises 60 to 96 mol% of $\alpha,\beta$-unsaturated carboxylic acid ester, 2 to 30 mol% of $\alpha,\beta$-unsaturated dicarboxylic acid anhydride and 2 to 38 mol% of styrene compound.

9. A thermoplastic polymeric material according to claim 6 wherein the unsaturated carboxylic acid ester copolymer comprises 60 to 96 mol% of $\alpha,\beta$-unsaturated carboxylic acid ester, 2 to 30 mol% of $\alpha,\beta$-unsaturated dicarboxylic acid anhydride and 2 to 38 mol% of unsaturated nitrile.

10. A resin composition comprising the thermoplastic polymeric material according to claim 1 or 6 and at least one substance selected from antioxidants and ultraviolet absorbers.

11. A glass fiber-reinforced resin composition comprising 40 to 95% by weight of the thermoplastic polymeric material according to claim 1 or 6 and 5 to 60% by weight of glass fiber.

12. A carbon fiber-reinforced resin composition comprising 40 to 95% by weight of the thermoplastic polymeric material according to claim 1 or 6 and 5 to 60% by weight of carbon fiber.

13. A method for producing a thermoplastic polymeric material having a fine dispersion microstructure of not greater than 5$\mu$ in average particle diameter of the disperse phase, which comprises melt-kneading 10 to 65% by weight of a hard styrene copolymer having a molecular weight of 30,000 to 300,000 and 90 to 35% by weight of a polyamide having a molecular weight of 10,000 to 50,000 at a temperature of 260° to 330° C. and a shearing rate of not lower than 100 sec$^{-1}$ under the absence of a radical generating catalyst, said styrene copolymer including 2 to 30 mol% of $\alpha,\beta$-unsaturated dicarboxylic acid anhydride and a styrene compound.

14. A method according to claim 13 wherein the styrene copolymer comprises 85 to 98 mol% of a styrene compound and 15 to 2 mol% of $\alpha,\beta$-unsaturated dicarboxylic acid anhydride.

15. A method according to claim 13 wherein the styrene copolymer comprises 40 to 96 mol% of a styrene compound, 2 to 30 mol% of $\alpha,\beta$-unsaturated dicarboxylic acid anhydride and 2 to 58 mol% of $\alpha,\beta$-unsaturated carboxylic acid ester.

16. A method according to claim 13 wherein the styrene copolymer comprises 50 to 96 mol% of a styrene compound, 2 to 30 mol% of $\alpha,\beta$-unsaturated dicarboxylic acid anhydride and 2 to 20 mol% of unsaturated nitrile.

17. A method for producing a thermoplastic polymeric material having a fine dispersion microstructure of not greater than 5$\mu$ in average particle diameter of the disperse phase, which comprises melt-kneading 10 to 65% by weight of a hard unsaturated carboxylic acid ester copolymer having a molecular weight of 30,000 to 300,000 and 90 to 35% by weight of a polyamide having a molecular weight of 10,000 to 50,000, said hard unsaturated carboxylic acid ester copolymer including 2 to 30 mol% of $\alpha,\beta$-unsaturated dicarboxylic acid anhydride and $\alpha,\beta$-unsaturated carboxylic acid ester.

18. A thermoplastic polymeric material according to claim 1, wherein the hard styrene copolymer has a flexural modulus of not lower than $2\times10^3$ kg/cm$^2$.

19. A thermoplastic polymeric material according to claim 6, wherein the hard unsaturated carboxylic acid ester copolymer has a flexural modulus of not lower than $2\times10^3$ $^{l\ kg/cm2}$.

20. A method according to claim 13, wherein the hard styrene copolymer has a flexural modulus of not lower than $2\times10^3$ kg/cm$^2$.

21. A method according to claim 17, wherein the hard unsaturated carboxylic acid ester copolymer has a flexural modulus of not lower than $2\times10^3$ kg/cm$^2$.

* * * * *